3,441,558
SULFATION OF STARCH FRACTIONS
Leo H. Kruger, Kendall Park, and Otto B. Wurzburg, Whitehouse Station, N.J., assignors to National Starch and Chemical Corporation, New York, N.Y., a corporation of Delaware
No Drawing. Continuation-in-part of application Ser. No. 430,731, Feb. 5, 1965. This application Mar. 4, 1968, Ser. No. 709,967
Int. Cl. C08b 19/12, 19/04
U.S. Cl. 260—233.5                               4 Claims

ABSTRACT OF THE DISCLOSURE

An improved process for the sulfation of the amylopectin fraction of the starch molecule via reaction with the addition product of trimethylamine and sulfur trioxide; said process resulting in the preparation of amylopectin sulfates which are devoid of the objectionable odor and taste as well as the variations in biological activity and physical properties which are typical of the amylopectin sulfates resulting from prior art preparative procedures. The subject process is far more efficient than the prior art techniques, both with respect to the mechanics of the reaction as well as with regard to the degree of sulfation in the resulting derivatives, and is characterized by the use, therein, of a systematic addition of alkali during the entire course of the preparative procedure as well as by the utilization of a specific stripping program for the removal of residual trimethylamine.

---

This application is a continuation-in-part of our application, Ser. No. 430,731, filed Feb. 5, 1965, now abandoned, and assigned to the assignee of the subject application.

In U.S. Patent No. 2,786,833, which issued on Mar. 26, 1957, there is described a method for the sulfation of amylaceous materials by means of a reaction with a reagent comprising the reaction product of sulfur trioxide and a tertiary amine. In said patent, amylaceous materials comprise polysaccharides of an amylaceous or starchy nature including starches from many sources such as corn, wheat, tapioca, rice, potato, etc.

Important strides have been made in recent years in the techniques used for fractionating the starch molecule into its component fractions. Thus, based on the knowledge that the starch molecule is composed of an amylose fraction having a linear molecular arrangement and an amylopectin fraction possessing a branched molecular arrangement, highly efficient methods have been developed for the separation of the starch into the latter components which have found uses in a wide variety of applications. Thus, for example, with respect to the utility of these starch fractions in the pharmaceutical area, it is known that the sulfation of the amylopectin fraction derived from potato starch has pepsin inhibitory and anti-coagulant properties. More particularly, U.S. Patent No. 3,271,388, which issued on Sept. 6, 1966, describes the perparation and use of these amylopectin sulfates and notes that they may be prepared by means of various processes including the sulfation of the amylopectin, in aqueous alkaline solution, utilizing a sulfation reagent comprising the addition product, or complex, of a tertiary amine such as trimethylamine, and sulfur trioxide.

Unfortunately, however, when attempts are made to utilize the latter reaction on a commercial scale, it is often found that unless the resulting amylopectin sulfates are subjected to costly and time consuming purification processes involving alcoholic precipitations and repeated washings, they have limited value for pharmaceutical purposes as a result of the presence of substantial residues of the tertiary amine which give the product a highly objectionable odor and taste. Moreover, when prepared by means of this reaction with the tertiary amine-sulfur trioxide addition product, the resulting amylopectin sulfates are also often characterized by wide variations in their biological activity and physical properties and thereby fail to meet the rigorous requirements for uniformity which are imposed upon pharmaceutical products before they may be offered to the public.

It is, thus the prime object of this invention to provide an improved process for the preparation of amylopectin sulfates, via the reaction with a trimethylamine-sulfur trioxide complex, said process being characterized by its improved efficiency with respect to the mechanics of the reaction as well as the increased sulfur content of the resulting derivatives and also by the absence of any trimethylamine residues in the derivatives; said derivatives also being found to possess uniform biological and physical properties.

We have now discovered a means for improving upon the efficiency of the reaction between amylopectin and the addition products of trimethylamine and sulfur trioxide and, even more significant, is the fact that the amylopectin sulfates resulting from the improved process of this invention are found to be devoid of the undesirable odor and taste resulting from the presence of any residual trimethylamine and they are also, surprisingly, characterized by their uniform biological activity and physical properties.

In brief, the improved process of this invention is characterized by two major innovations. The first of these innovations involves carefully programming the addition of alkali during the entire course of the reaction between the amylopectin and the trimethylamine-sulfur trioxide complex so that the pH of the system is continually maintained in the range of from about 10.5–12.0. Thus, it has been found that by conducting the reaction at a pH which is below the latter stated lower limit of 10.5, the time required for the reaction becomes excessively long and the process is, therefore, uneconomical. In addition, the sulfur content of the resulting amylopectin sulfate is reduced to a level which substantially diminishes its biological activity. Similarly, if the suggested maximum pH of 12.0 is exceeded, the biological activity of the sulfated amylopectin derivative is also found to be substantially decreased as a result of their reduced sulfur content.

The second of the major innovations required in the improved process of this invention involves a stripping operation for the removal of the residual trimethylamine from the sulfated amylopectin derivative subsequent to its preparation; the latter stripping operation involving the initial use of a vacuum distillation followed by the addition of water which is also removed by distillation, both of these distillation operations being conducted under carefully controlled conditions of alkalinity whereby the pH of the system is maintained at a level of from about 10.5 to 12.0. The latter stripping procedure must be carefully followed since the failure to maintain the pH level over the above stated minimum limit or to follow the vacuo strip with a water strip leaves undesirably high levels of trimethylamine residue in the sulfated amylopectin. On the other hand, if the pH during the stripping operation exceeds the specified maximum level, the resulting derivative will undergo deterioration which will serve to decrease its biological activity.

The improved process of this invention will now be considered in greater detail.

The amylopectin applicable for use in the improved sulfation process of this invention should, preferably, be obtained from the fractionation of potato starch although, if desired, the amylopectin fraction may be obtained from other sources including, for example, corn starch, high amylose corn starch, wheat starch, rice starch, sago starch, and tapioca.

According to our invention, amylopectin is treated with a reagent comprising the reaction product of sulfur trioxide and trimethylamine. The latter reagent may be prepared by reacting tirmethylamine with sulfur trioxide. An actual example of the preparation of the addition product is described below in Example A.

For purposes of brevity we shall hereafter refer to the said addition product of the trimethylamine and sulfur trioxide as the "reagent."

Example A.—We dissolved 16.7 grams of gaseous trimethylamine in 190 ml. of chloroform. Maintaining anhydrous reaction conditions, 12 ml. of liquid sulfur trioxide were slowly added to the above solution, with constant agitation, keeping the temperature within the range 15–20° C. by cooling. The addition product of trimethylamine and sulfur trioxide precipitated as a finely divided white mass, which was filtered and dried in vacuo. The crystals had a melting point of 240° C. This melting point corresponded exactly with that reported in the J. Am. Chem. Soc., 65, p. 1632 (1943).

Instead of reacting the trimethylamine directly with sulfur trioxide, one may achieve the same result by reacting the amine with a reagent acting as a donor of $SO_3$ such, for example, as chlorsulfonic acid. Still another method is indicated in U.S. Patent No. 2,386,693, where the addition product of trimethylamine and sulfur trioxide is made by the reaction of dimethyl sulfate and tetramethyl sulfamide. The complex may also be made by a gaseous reaction of trimethylamine with sulfur trioxide using a relatively unreactive gas, such as nitrogen, as a diluent.

According to our process, the reaction between the amylopectin and the addition product must take place in the presence of water. Thus, the amylopectin may be suspended or dispersed in water during the reaction. From the point of view of operating economy and efficiency, this is a most important advantage, as compared to those previous methods which required anhydrous conditions and/or the use of organic liquid media.

The amylopectin should be admixed with water to form a smooth dispersion having a solids content in the neighborhood of about 25%, by weight, although, depending upon the equipment utilized, it may range from about 14% to as high as about 30%. The carefully programmed addition of an aqueous solution of sodium hydroxide which is designed to keep the pH to 10.5–12.0, although once again the actual level of caustic is not particularly critical, is then started. At the same time, after, or prior to the addition of the sodium hydroxide solution, the temperature of the amylopectin is raised to a level of from about 115° F. to 132° F., with 122° F. being the preferred reaction temperature.

Simultaneous, or after the addition of the initial portions of alkali solution, the trimethylamine-sulfur trioxide addition product is slowly added to the dispersion. This may be added as a dry solid or as a concentrated suspension in water. The amount of the latter reagent, as based on the weight of amylopectin solids, should be at least about 150% or higher, depending upon the concentration of the amylopectin. If the specified minimum concentration of the reagent is not used, the sulfur content of the resulting amylopectin sulfate will not be high enough to display the desired biological potency.

If the temperature during the major course of the reaction is substantially below about 115° F., the reaction rate will be slow and the time required for the completion of the reaction will be excessive. When the temperature substantially exceeds 132° F., the reaction efficiency again goes down and the resulting product displays reduced biological activity. It also results in products with poor textural characteristics. After the temperature is within the range of 115° F. to 132° F., the reaction is continued until the sulfation stops. The precise length of time required for the completion of the sulfation reaction will, of course, be dependent upon the particular pH and reaction temperature which are utilized; the use of a higher pH and a higher reaction temperature leading to the attainment of a faster reaction time. During this entire reaction period the alkalinity must be maintained, through programmed addition of the caustic, when required, so as to maintain the pH in the range of 10.5 to 12.0.

Upon completion of the reaction, the first phase of the second essential element of our process is initiated. This involves stripping the bulk of the residual trimethylamine from the system by means of a procedure whereby the pressure in the vessel is slowly reduced to a level of no higher than about five inches of mercury, that is a vacuum of no less than about 25 inches of mercury, while the temperature of the system is being maintained at 115° F. to 132° F. During this process the alkalinity must be maintained at a pH of 10.5 to 12.0 through programmed caustic addition. If the pH, during the vacuum stripping, falls substantially below pH 10.5 it will be difficult to remove the residual trimethylamine and if the pH is significantly above 12.0, the biological activity of the resultant products will be reduced.

The second phase of the stripping process involves the addition of water while continuing to maintain the pH temperature and vacuum as specified for the vacuum stripping. The added water is allowed to distill off and in doing so it completes the removal of the residual trimethylamine in the system. Usually about 150 to 300% of water is used, as based on the weight of the amylopectin.

This stripping operation is followed by means of in-process controls for determining the level of residual trimethylamine in the system. In general, we have found that if the level of free residual trimethylamine in the final product is below about 100 p.p.m. an acceptable product for pharmaceutical purposes is obtained.

After the stripping operation is completed, the material is dialyzed to a residual salt content below about 5% as based on the weight of amylopectin sulfate. While we do not wish to imply any limitations, generally we adjust the solids content at this point, to about 25% and the pH to about 11, prior to the dialysis operation.

Dialysis may be run by either a batch or a continuous process, using membranes such as polyvinyl chloride, parchment or cellophane. Electrodialysis may also be used. Any type of water having reasonable purity may be used as the dialysis solvent. Although, if a product is desired in the form of the sodium salt, distilled, deionized or softened water should be used in the dialysis operation.

As the final step in our process, the dialyzed solution containing amylopectin sulfate should be spray dried. We have found that the inlet temperature of the spray dryer should be in the range of about 400°–500° F., while the outlet temperature should range in the neighborhood of about 190° to 250° F. This, of course, will vary depending upon the equipment design. However, an excessive inlet temperature may promote charring of the amylopectin sulfate. Outlet temperatures which are too low must similarly be avoided otherwise the product will not be produced as a free flowing powder but rather as a clumpy mass.

It is also possible, of course, to concentrate the dialyzed product prior to spray drying in order to reduce spray drying costs. It should be pointed out, however, that in this concentration step it is imperative to keep the pH below about 12 and above about 7. If the pH during this operation rises significantly above 12 there will be a marked drop in biological potency. At pH's below 7 there is a danger of desulfation. If the pH is significantly below 7 an autocatalytic desulfation may be initiated.

The sulfated amylopectin resulting from the process of this invention should contain about 1.4 to 2.0 sulfate groups per anhydroglucose unit. The average number of sulfate groups per anhydrous glucose units of the amylopectin is referred to as a degree of substitution, which is abbreviated "D.S." Thus the D.S. of the novel sulfated amylopectin of this invention should range from about 1.4 to 2.0. This corresponds to a sulfur content of about 14.5 to 17.5%, as based on the anhydrous weight of the amylopectin sulfate.

EXAMPLE I

Into a jacketed reaction vessel equipped with means for mechanical agitation and containing 1,100 parts of softened water (deionized, distilled, or tap water may also be used) 275 parts of amylopectin fractionated from potato starch was added, with stirring. After 30 minutes agitation, the pH was adjusted to about 10.5–11.0 with portions of a 25%, by weight, aqueous NaOH solution. The temperature was 80° F.

Six hundred and twenty parts of the trimethylamine-sulfur trioxide addition product were slowly added over a period of one and a half hours. Simultaneously, more of the 25% NaOH solution was introduced by means of a programmed addition designed to maintain the pH at 11.0. This programmed addition was maintained throughout the entire reaction.

After all the trimethylamine-sulfur trioxide addition product was added, the vessel was closed and a vacuum of 12″ water was applied in order to initiate the removal of some of the trimethylamine which was being formed during the reaction. At the same time the temperature was slowly raised to 122° F. over a period of one and a half hours with continuing programmed additions of caustic. After 11 hours at 122° F., with caustic additions programmed to keep the pH at 11.0, the reaction was completed.

The vacuum was then raised to 27″ mercury and the trimethylamine was removed by stripping while the pH was maintained at 11 through the programmed addition of the 25% NaOH solution. After the bulk of the trimethylamine was removed, water stripping was started using 1150 parts of water while keeping the pH at about 11.

The free trimethylamine content was reduced to below 100 p.p.m. after which the vacuum was removed and the solids adjusted to a level of 25%, by weight, and the pH to 10.8–11.0. The resulting solution was then dialyzed continuously against soft water, using parchment as a membrane to a salt content of 5% $Na_2SO_4$ based on the starch solids.

The pH at this stage was about 8. The product was then spray dried using an inlet temperature of 450° F. and an outlet temperature of 210° F.

The resulting spray dried amylopectin sulfate was in the form of a white powder which dispersed in cold water to give a solution having a viscosity of 150 cps. at a 5%, by weight, concentration when determined, at 72° F., using a Brookfield Viscometer. This product was entirely devoid of any odor or taste resulting from the presence of any residual traces of unreacted trimethylamine.

The concentration of sulfate ion, i.e. the D.S. as well as the concentration of elemental sulfur, in the resulting product was obtained by hydrolyzing one part of the salt free amylopectin sulfate with ten parts of a 5%, by weight, aqueous hydrochloric acid solution. This mix was boiled for 3 to 4 hours and the resulting carbonaceous material was filtered off. The sulfate ion was then determined by being precipitated out of solution with barium chloride; the precipitate of barium sulfate then being filtered off and weighed. The above described analytical procedure was utilized in all of the subsequent examples.

The efficiency of the improved sulfation technique of this invention was thus evidenced by the fact that the above described amylopectin sulfate had a sulfur content of 15.5%, by weight, and a D.S. within the range of 1.4 to 2.0. Of even greater significance was the fact that this derivative displayed an exceedingly strong inhibitory action towards pepsin, thereby demonstrating its high degree of biological activity.

EXAMPLE II

This example illustrates the criticality, with respect to the improved process of this invention, of maintaining the concentration of the trimethylamine-sulfur trioxide addition product within the above stated range of at least about 150%, by weight, of the amylopectin present in the system.

Thus, the preparative procedure set forth in Example I, hereinabove, was repeated in its entirety. In this instance, however, only 413 parts of the trimethylamine-sulfur trioxide addition product, amounting to a concentration of only 150% of the weight of the amylopectin, was added to the system. In contrast, it is to be noted that in Example I, the concentration of the latter reagent was 225% by weight of the amylopectin.

Thus, it was found that the amylopectin sulfate resulting from this reaction contained only 14.5% of sulfur, on an anhydrous basis, which was equivalent to a D.S. of only 1.4, thereby indicating that the efficiency of the reaction was well below that of Example I where a sulfur content of 15.5% was achieved. And, even more significant, was the fact that this derivative had a borderline degree of biological activity as evidenced by the fact that twice as much of it, on a weight basis, was required in order to obtain the identical degree of pepsin inhibitory action which was attained with the product of Example I.

EXAMPLE III

This example illustrates the criticality, with respect to the improved process of this invention, of maintaining the pH of the system within the specified range of 10.5–12.0 throughout the entire course of the reaction by the programmed addition of portions of an aqueous alkali solution, where needed.

Thus, we carried out two repetitions of the preparative procedure described in Example I, hereinabove. In each repetition, all of the process variables were identical to those of Example I with the single exception that whereas the pH of the system was maintained at a level of from about 10.5–12.0 throughout the process of Example I, the pH of the system during the first repetition was maintained at a level of only 9.5 whereas, during the second repetition, it was maintained at a level of 12.5. Thus, in the first repetition, the pH of the system was below our specified minimum of 10.5 whereas in the second repetition, it was above our stated maximum of 12.0.

During the course of the reaction carried out during the first repetition, it was found that in order for the reaction to proceed, it was necessary to conduct it under decidedly inefficient conditions, namely at a temperature of 150° F. and for a total reaction time of 40 hours as compared with the use of a reaction temperature of 122° F. and a total reaction time of only 11 hours in Example I. And, of even greater significance, was the fact that the sulfur content of the resulting derivative was only 14.5%, equivalent to a D.S. of 1.4, and its biological activity, as demonstrated by its pepsin inhibitory activity, was only about half that, on a weight basis, of the activity displayed by the product of Example I.

With respect to the second repetition of Example I which was conducted at a pH of 12.5, it was found that although it would be conducted at the same reaction temperature and for the same reaction period as were utilized for Example I, the resulting amylopectin sulfate had a sulfur content of only 14.5%, equivalent to a D.S. of 1.4, so that its biological activity, as demonstrated by its pepsin inhibitory action, was only equivalent, on a weight basis, to half that of the product resulting from the process of Example I.

EXAMPLE IV

This example illustrates the criticality, with respect to the process of this invention, of conducting the stripping operation under the narrowly defined conditions which have been set forth in the preceding discussion.

Thus, we carried out three repetitions of the preparative procedure described in Example I, hereinabove. In each repetition, all of the process variables were identical to those of Example I with the exception that, in each repetition certain changes were made in the procedure employed during the stripping operation which followed the actual reaction between the trimethylamine-sulfur trioxide addition product and the amylopectin.

Thus, in the repetition #1, the reaction product was subject to the vacuum stripping operation at a pressure of 3 inches of mercury and at a controlled pH of about 11.0 as was the case in Example I. However, it was not, thereafter, subjected to the necessary water stripping operation. Accordingly, it was found that the amylopectin sulfate resulting from this run was entirely unsatisfactory for use in pharmaceutical applications inasmuch as it possessed a highly pronounced odor resulting from the presence of about 340 p.p.m. of free residual trimethylamine.

In repetition #2, both the vacuum and subsequent water stripping operations were carried out as in Example I with the exception that the pH of the system was, in this case, at a level which was below 10.0. Again, it was found that the resulting amylopectin sulfate was entirely unsatisfactory for use in pharmaceutical applications because it possessed a highly pronounced odor resulting from the presence of more than 400 p.p.m. of free residual trimethylamine.

In repetition #3, both the vacuum and subsequent water stripping operations were carried out as in Example I. However, in this instance, the pH of the system was maintained at a level of about 12.5 which is, of course, above our stated maximum pH of 12.0. Although the amylopectin sulfate resulting from this procedure did not have an undesirable odor and taste resulting from the presence of an excessive concentration of residual trimethylamine, it was nonetheless unsatisfactory for use in pharmaceutical applications as a result of its low degree of biological activity as evidenced by its relative ineffectiveness as a pepsin inhibitory agent. This low degree of biological activity resulted from the physical deterioration of the derivative as a result of the high pH which it encountered during the stripping operation.

Summarizing, this invention is seen to provide the practitioner with an improved process for preparing amylopectin sulfates, and process being characterized by its efficiency and by its ability to provide amylopectin sulfates having the requisite sulfur concentration needed for them to demonstrate a high degree of biological activity as well as by their freedom from any undesirable tastes or odors resulting from the presence of residual tertiary amine. Variations may be made in proportions, procedures and materials without departing from the scope of this invention as defined by the following claims.

We claim:

1. A process for the preparation of amylopectin sulfates by means of the reaction, in an aqueous medium, between amylopectin and a trimethylamine-sulfur trioxide reaction product; said process comprising the steps of: (1) dispersing the amylopectin in water; (2) adjusting the pH of the dispersion to within the range of from about 10.5 to 12.0 by the addition of a sufficient quantity of an aqueous sodium hydroxide solution and thereupon slowly adding the trimethylamine-sulfur trioxide reaction product to the resulting aqueous amylopectin dispersion; the concentration of said trimethylamine-sulfur trioxide addition product being in the range of from at least about 150% as based on the weight of amylopectin present in the dispersion; (3) reacting the amylopectin with said trimethylamine-sulfur trioxide addition product at a temperature of from about 115 to 132° F. and for a period of time sufficient to complete the sulfation reaction while continually maintaining the pH of the system throughout the entire course of said reaction at a level of from about 10.5 to 12.0 by the addition, when needed, of portions of said aqueous sodium hydroxide solution; (4) subjecting the resulting reaction product comprising an aqueous dispersion of amylopectin sulfate to a two-phase stripping operation for the removal of residual trimethylamine, the first phase of said stripping operation comprising reducing the pressure of the system to a range of no higher than about 5 inches of mercury and maintaining the temperature of the system in the range of from about 115 to 132° F. so as to thereby distill from the system the bulk of the residual trimethylamine and, while maintaining the pressure of the system in the range of no higher than about 5 inches of mercury and with the temperature in the range of from about 115 to 132° F., thereafter conducting the second phase of said stripping operation by adding water to the system and subsequently distilling it therefrom so as to complete the removal of the residual trimethylamine from the system; the pH of the system throughout both phases of said stripping operation being maintained in the range of from about 10.5 to 12.0 by the addition, when needed, of portions of said aqueous sodium hydroxide solution; (5) thereupon dialyzing the aqueous residue from the stripping operation containing the amylopectin sulfate therein so as to reduce its residual salt content to a minimal level; and (6) completing the process by spray drying the dialyzed dispersion so as to obtain the amylopectin sulfate in the form of a dry powder.

2. The process of claim 1, wherein the amylopectin sulfate resulting therefrom has had its free residual trimethylamine reduced to a concentration of less than about 100 p.p.m.

3. The process of claim 1, wherein the amylopectin sulfate resulting therefrom has a D.S. in the range of from about 1.4 to 2.0 and a sulfur concentration in the range of from about 14.5 to 17.5%, as based on the anhydrous weight of the amylopectin sulfate.

4. In the process of preparing amylopectin sulfates by means of the reaction, in an aqueous medium, between amylopectin and a trimethylamine-sulfur trioxide reaction product, the improvements which comprise: (1) continually maintaining the pH of the system at a level in the range of from about 10.5 to 12.0 throughout both the admixture and subsequent reaction of said amylopectin with said trimethylamine-sulfur trioxide reaction product; the maintenance of the pH of the system within the latter limits being accomplished by the addition, when required, of portions of an aqueous sodium hydroxide solution; and (2) subjecting the resulting reaction product comprising an aqueous dispersion of amylopectin sulfate to a two-phase stripping operation for the removal of residual trimethylamine, the first phase of said stripping operation comprising reducing the pressure of the system to a range of no higher than about 5 inches of mercury and maintaining the temperature of the system in the range of from about 115 to 132° F. so as to thereby distill from the system the bulk of the residual trimethylamine and, while maintaining the pressure of the system in the range of no higher than about 5 inches of mercury and with the temperature in the range of from about 115 to 132° F., thereafter conducting the second phase of said stripping operation by adding water to the system and subsequently distilling it therefrom so as to complete the removal of the residual trimethylamine from the system; the pH of the system throughout both phases of said stripping operation being maintained in the range of from about 10.5 to 12.0 by the addition, when needed, of portions of said aqueous sodium hydroxide solution.

References Cited

UNITED STATES PATENTS

| | | | |
|---|---|---|---|
| 3,271,388 | 9/1966 | Cammarata et al. | 260—233.5 |
| 3,070,595 | 12/1962 | Petracek et al. | 260—234 |
| 3,067,067 | 12/1962 | Etheridge et al. | 127—71 |
| 3,017,407 | 1/1962 | Petracek et al. | 260—234 |

FOREIGN PATENTS 677,557   1/1964   Canada.

DONALD E. CZAJA, Primary Examiner.
R. W. MULCAHY, Assistant Examiner.

U.S. Cl. X.R.

424—180